US012684267B2

(12) United States Patent     (10) Patent No.:   US 12,684,267 B2

Ishikawa et al.     (45) Date of Patent:    Jul. 14, 2026

(54) IMAGING SYSTEM, MOVABLE APPARATUS, IMAGING METHOD, AND STORAGE MEDIUM

(71) Applicant: CANON KABUSHIKI KAISHA, Tokyo (JP)

(72) Inventors: Yoshikazu Ishikawa, Kanagawa (JP); Soya Fujimori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 280 days.

(21) Appl. No.: 18/670,764

(22) Filed: May 22, 2024

(65) Prior Publication Data

US 2024/0430594 A1    Dec. 26, 2024

(30) Foreign Application Priority Data

Jun. 23, 2023    (JP) ................................. 2023-103782

(51) Int. Cl.
*H04N 25/773*     (2023.01)
*H04N 25/71*     (2023.01)

(52) U.S. Cl.
CPC ......... *H04N 25/773* (2023.01); *H04N 25/745* (2023.01)

(58) Field of Classification Search
CPC .... H04N 25/7795; H04N 23/61; H04N 25/79; H04N 25/78; H04N 25/773; G06V 20/58
See application file for complete search history.

(56) References Cited

U.S. PATENT DOCUMENTS

2007/0222877 A1\*   9/2007   Kurane  ...............   H04N 25/443
                                          348/E3.02
2018/0338102 A1   11/2018   Saito
                    (Continued)

FOREIGN PATENT DOCUMENTS

JP        7223070 B2     2/2023

OTHER PUBLICATIONS

Extended European Search Report issued by the European Patent Office on Nov. 4, 2024 in corresponding EP Patent Application No. 24176572.6.

(Continued)

*Primary Examiner* — Lin Ye
*Assistant Examiner* — Tuan H Le
(74) *Attorney, Agent, or Firm* — Carter, DeLuca & Farrell LLP

(57) ABSTRACT

An imaging system includes a plurality of pixels each including a sensor unit configured to output pulses corresponding to photons and a counter configured to count the number of pulses. The imaging system generates a signal on the basis of a difference between count values of the counter when a storage period starts and when the storage period ends, performs storage operations of a first storage period and a second storage period within one full-frame period, and performs a control process in which the first storage period is shorter than the second storage period and a signal generated in the first storage period is output between an end of the first storage period and an end of the second storage period. The imaging system performs a recognition process on the basis of the generated signal and changes a recognition frequency on the basis of driving state information about a driving state of a movable apparatus.

14 Claims, 15 Drawing Sheets

(56) References Cited

U.S. PATENT DOCUMENTS

| 2019/0394414 A1* | 12/2019 | Kawazu .............. H04N 17/002 |
|---|---|---|
| 2022/0201182 A1 | 6/2022 | Maekawa |
| 2023/0064794 A1 | 3/2023 | Okamoto |
| 2024/0078803 A1* | 3/2024 | Aoki ......................... G06T 7/00 |
| 2024/0373149 A1* | 11/2024 | Yamashita ............. H04N 25/78 |
| 2024/0406574 A1 | 12/2024 | Saito |
| 2024/0406598 A1 | 12/2024 | Saito |

OTHER PUBLICATIONS

European Office Action issued by the European Patent Office on Dec. 15, 2025 in corresponding EP Patent Application No. 24176572. 6, pp. 1-5.

* cited by examiner

FIG. 9

IMAGING SYSTEM, MOVABLE APPARATUS, IMAGING METHOD, AND STORAGE MEDIUM

BACKGROUND OF THE INVENTION

Field of the Invention

The present invention relates to an imaging system, a movable apparatus, an imaging method, a storage medium, and the like.

Description of the Related Art

In recent years, photoelectric conversion devices that digitally count the number of photons incident on an avalanche photodiode (APD) and output a count value from a pixel as a photoelectrically converted digital signal have been developed. Also, for example, in Japanese Patent No. 7223070, a configuration in which a photoelectric conversion device having an APD can output a plurality of videos having overlapping storage periods, and therefore continuous imaging is possible even in a low intensity of illuminance is disclosed.

However, for example, assuming an imaging element of an in-vehicle camera installed in a movable apparatus, because a recognition process is performed in units of frames in driving of a normal sensor, for example, in the case of 30 fps, the recognition process can only be performed every 33.3 ms. Therefore, in the in-vehicle camera, even if a physical object jumps in immediately after the frame is switched, the recognition process cannot be applied before the end of the frame.

Also, in in-vehicle cameras, the storage period is often set to a certain period (11 ms) or more to suppress flicker caused by traffic lights, and the storage period is lengthened to brightly perform imaging, especially in a low intensity of illuminance. However, because the storage period is lengthened, subject blur occurs for a physical object moving at a high speed, and a recognition rate decreases.

Furthermore, when the traveling speed of the vehicle increases and the vehicle travels at a high speed, because a speed relative to the physical object increases, subject blur occurs and the recognition rate decreases in this case as well. In addition, even in a case where the vehicle turns at an intersection or travels on a curve, because subject blur in a yaw direction (especially on an outer circumferential side) occurs, the recognition rate decreases.

SUMMARY OF THE INVENTION

According to a first aspect of the present invention, there is provided an imaging system including:
  a plurality of pixels each including a sensor unit configured to output pulses corresponding to photons and a counter configured to count the number of pulses; and
  at least one processor or circuit configured to function as:
  a control unit configured to generate a signal on the basis of a difference between count values of the counter when a storage period starts and when the storage period ends, perform storage operations of a first storage period and a second storage period within one full-frame period, and perform a control process in which the first storage period is shorter than the second storage period and a signal generated in the first storage period is output between an end of the first storage period and an end of the second storage period; and a recognition unit configured to perform a recognition process on the basis of the generated signal and change a recognition frequency on the basis of driving state information about a driving state of a movable apparatus.

Further features of the present invention will become apparent from the following description of embodiments with reference to the attached drawings.

BRIEF DESCRIPTION OF THE DRAWINGS

FIG. 9 is a diagram showing a relationship of memory circuits and buffers in the embodiment.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate description will be omitted or simplified.

Figure 1:
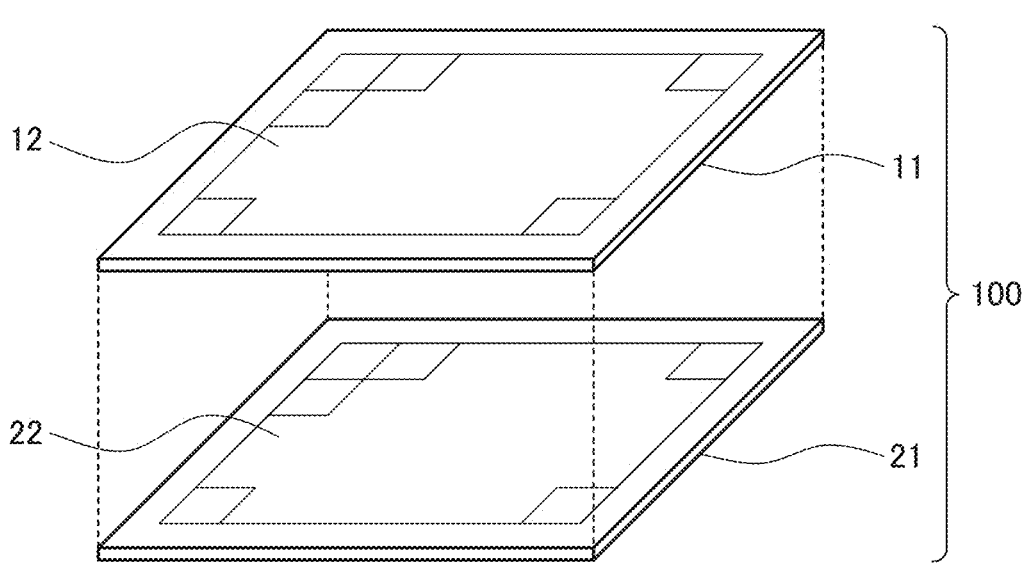
FIG. 1 is a diagram showing an example of a configuration of a photoelectric conversion element of an embodiment of the present invention.

FIG. 1 is a diagram showing an example of a configuration of a photoelectric conversion element of an embodiment of the present invention. Hereinafter, an example of an imaging system having a so-called laminated structure with a configuration in which a photoelectric conversion element 100 includes two boards, i.e., a sensor board 11 and a circuit board 21, which are laminated and electrically connected, will be described.

However, a so-called non-laminated structure in which a configuration included in the sensor board and a configuration included in the circuit board are arranged on a common semiconductor layer may be adopted. The sensor board 11 includes a pixel region 12. The circuit board 21 includes a circuit region 22 where the signal detected in the pixel region 12 is processed.

Figure 2:
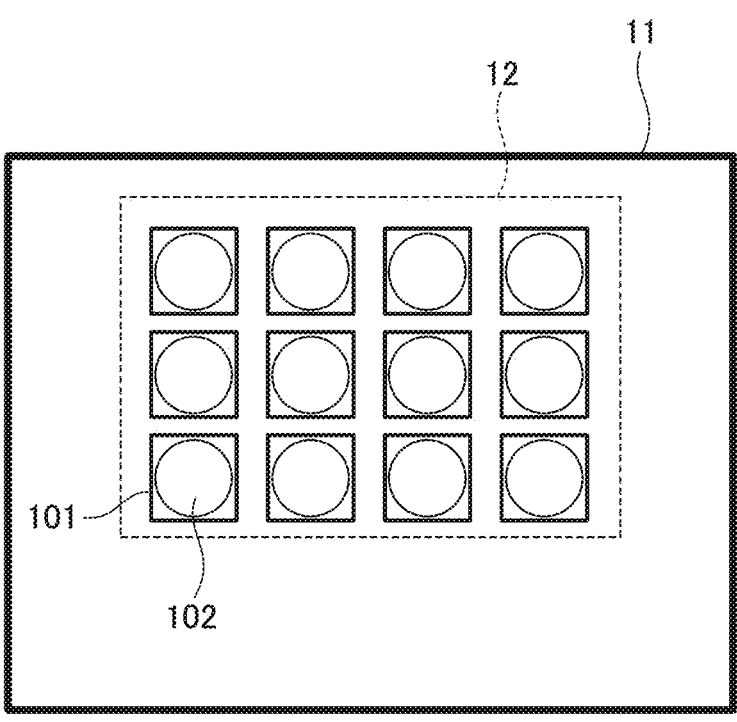
FIG. 2 is a diagram showing an example of a configuration of a sensor board 11.

FIG. 2 is a diagram showing an example of a configuration of the sensor board 11. The pixel region 12 of the sensor board 11 includes a plurality of pixels 101 two-dimensionally arranged in a plurality of row and column directions. The pixel 101 includes a photoelectric conversion unit 102 including an avalanche photodiode (hereinafter referred to as an APD).

Here, the photoelectric conversion unit 102 functions as a sensor unit configured to output pulses corresponding to photons. The number of rows and the number of columns of the pixel array constituting the pixel region 12 are not particularly limited.

Figure 3:
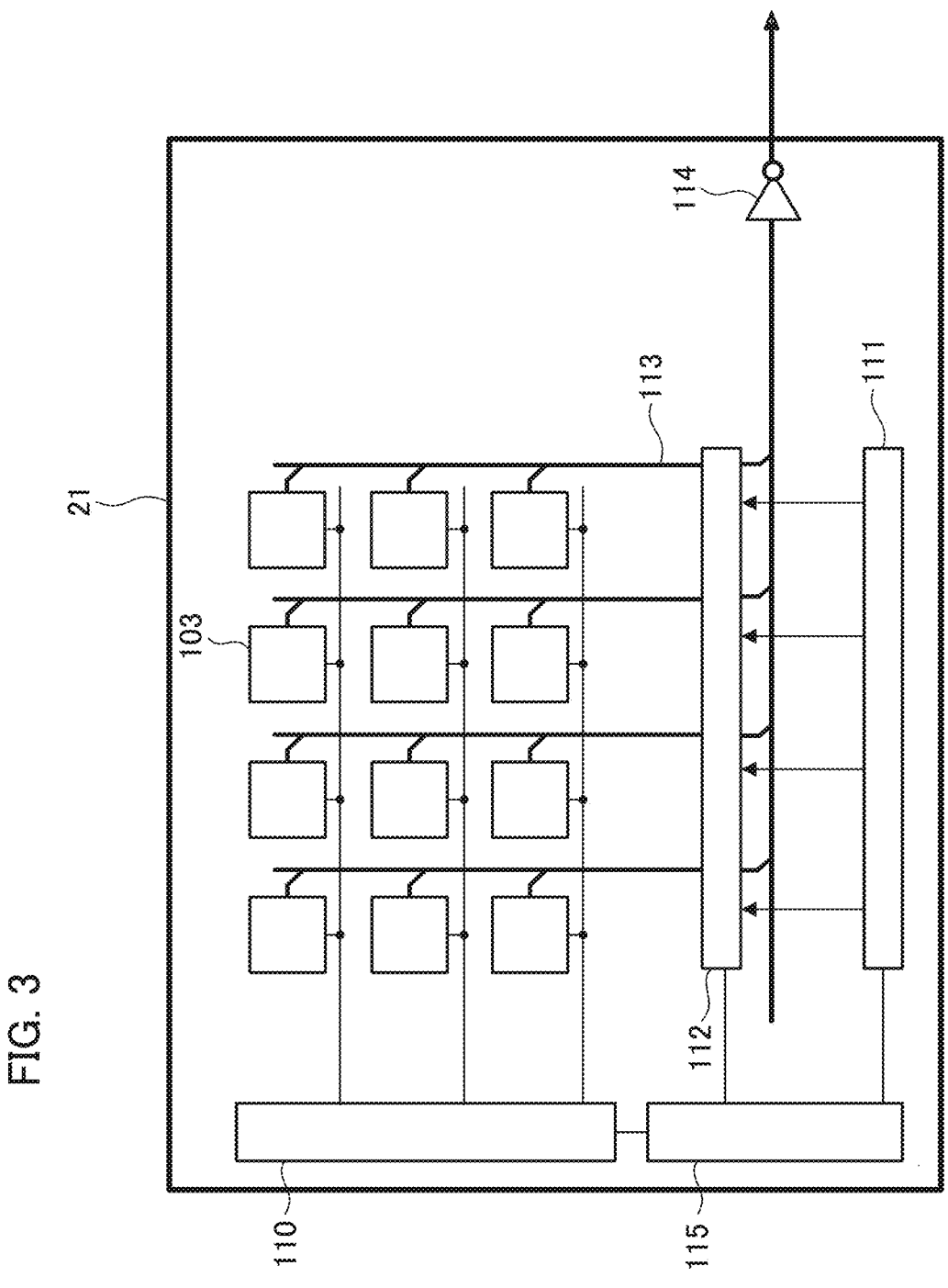
FIG. 3 is a diagram showing an example of a configuration of a circuit board 21.

FIG. 3 is a diagram showing an example of a configuration of the circuit board 21. The circuit board 21 includes a signal processing circuit 103 configured to process electric charge after a photoelectric conversion process of each photoelectric conversion unit 102 of FIG. 2, a reading circuit 112, a control pulse generation unit 115, a horizontal scanning circuit 111, a vertical signal line 113, a vertical scanning circuit 110, and an output circuit 114.

The vertical scanning circuit 110 receives control pulses supplied from the control pulse generation unit 115 and sequentially supplies the control pulses to a plurality of pixels arranged in the row direction. Logic circuits such as a shift register and an address decoder are used in the vertical scanning circuit 110.

A signal output from the photoelectric conversion unit 102 of each pixel is processed by each signal processing circuit 103. The signal processing circuit 103 includes a counter, a memory, and the like, and a digital value is held in the memory. The horizontal scanning circuit 111 inputs control pulses for sequentially selecting columns to the signal processing circuit 103 so that the signal is read from the memory of each pixel in which the digital signal is held.

A signal is output to the vertical signal line 113 from the signal processing circuit 103 of the pixel of the row selected by the vertical scanning circuit 110. The signal output to the vertical signal line 113 is output to the outside of the photoelectric conversion element 100 via the reading circuit 112 and the output circuit 114. A plurality of buffers connected to the vertical signal line 113 are built into the reading circuit 112.

As shown in FIGS. 2 and 3, a plurality of signal processing circuits 103 are arranged in a region overlapping the pixel region 12 in a planar view. Also, in the planar view, the vertical scanning circuit 110, the horizontal scanning circuit 111, the reading circuit 112, the output circuit 114, and the control pulse generation unit 115 are arranged to overlap between an end of the sensor board 11 and an end of the pixel region 12.

In other words, the sensor board 11 has the pixel region 12 and a non-pixel region arranged around the pixel region 12. Also, the vertical scanning circuit 110, the horizontal scanning circuit 111, the reading circuit 112, the output circuit 114, and the control pulse generation unit 115 are arranged in a region overlapping the non-pixel region in the planar view.

Furthermore, the arrangement of the vertical signal line 113, the reading circuit 112, and the output circuit 114 is not limited to the example shown in FIG. 3. For example, the vertical signal line 113 may be arranged to extend in the row direction and the reading circuit 112 may be arranged at a destination where the vertical signal line 113 extends. Also, the signal processing circuits 103 do not necessarily need to be provided one for one for all photoelectric conversion units, and a configuration in which one signal processing circuit is shared by a plurality of photoelectric conversion units and signal processing is sequentially performed may be adopted.

Figure 4:
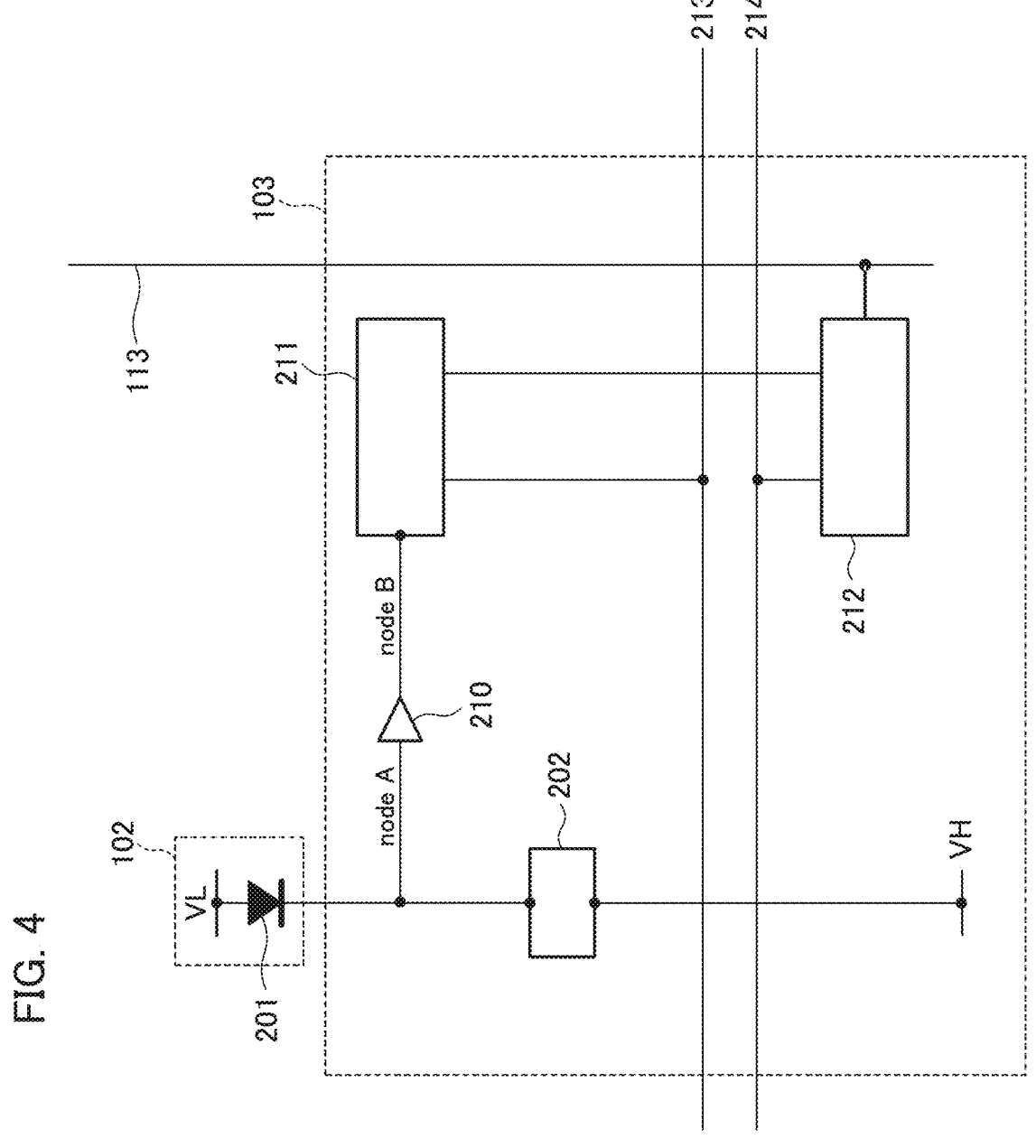
FIG. 4 is a diagram showing an equivalent circuit of a pixel 101 and a signal processing circuit 103 corresponding to the pixel 101 in FIGS. 2 and 3.

FIG. 4 is a diagram showing an equivalent circuit of the pixel 101 and the signal processing circuit 103 corresponding to the pixel 101 in FIGS. 2 and 3. As shown in FIG. 4, each pixel 101 includes a photoelectric conversion unit 102, a counter circuit 211, a memory circuit 212, and the like as a sensor unit.

The APD 201 included in the photoelectric conversion unit 102 generates an electric charge pair corresponding to incident light in photoelectric conversion. One of two nodes of the APD 201 is connected to a power line to which a drive voltage VL (first voltage) is supplied. Also, the other of the two nodes of the APD 201 is connected to a power line to which a drive voltage VH (second voltage) higher than the drive voltage VL is supplied.

In FIG. 4, one node of the APD 201 is an anode and the other node of the APD is a cathode. The anode and cathode of the APD 201 are supplied with a reverse bias voltage so that the APD 201 performs an avalanche multiplication operation. In a state in which this voltage is supplied, the electric charge generated by the incident light causes avalanche multiplication, and an avalanche current is generated.

Furthermore, when the reverse bias voltage is supplied, there are a Geiger mode in which a voltage difference between the anode and the cathode is operated as a voltage difference greater than a breakdown voltage and a linear mode in which a voltage difference between the anode and the cathode is operated as a voltage difference near the breakdown voltage or less than or equal to the breakdown voltage. An APD operating in the Geiger mode is referred to as an SPAD. In the case of the SPAD, for example, the drive voltage VL (first voltage) is −30 V and the drive voltage VH (second voltage) is 1 V.

The signal processing circuit 103 includes a quenching element 202, a waveform shaping unit 210, a counter circuit 211, and a memory circuit 212. The quenching element 202 is connected to a power line to which the drive voltage VH is supplied and to one of the anode and cathode of the APD 201.

The quenching element 202 functions as a load circuit (quenching circuit) during signal multiplication based on avalanche multiplication, suppresses the voltage supplied to the APD 201, and has a function of suppressing avalanche multiplication (quenching operation). Also, the quenching element 202 has a function of returning the voltage supplied to the APD 201 to the drive voltage VH by causing an amount of electric current for the voltage drop to flow in the quenching operation (recharge operation).

In FIG. 4, an example in which the signal processing circuit 103 includes the waveform shaping unit 210, the counter circuit 211, and the memory circuit 212 in addition to the quenching element 202 is shown.

The waveform shaping unit 210 shapes a change in a voltage of the cathode of the APD 201 obtained at the time of photon detection and outputs a pulse signal. As the waveform shaping unit 210, for example, an inverter circuit is used. Although an example in which one inverter is used as the waveform shaping unit 210 is shown in FIG. 4, a circuit in which a plurality of inverters are connected in series may be used or another circuit having a waveform shaping effect may be used.

The counter circuit 211 counts the number of pulses output from the waveform shaping unit 210 and holds a count value. Also, when a control pulse RES is supplied via a drive line 213, the signal held in the counter circuit 211 is reset. Here, the counter circuit 211 generates a signal on the basis of a difference between count values when the storage period starts and when the storage period ends.

The memory circuit 212 is supplied with a control pulse SEL from the vertical scanning circuit 110 of FIG. 3 via a drive line 214 of FIG. 4 (not shown in FIG. 3) and the counter circuit 211 and the vertical signal line 113 are electrically connected or disconnected in a switching process. The memory circuit 212 functions as a memory for temporarily storing a count value of the counter and outputs an output signal from the counter circuit 211 of the pixel to the vertical signal line 113.

Furthermore, an electrical connection may be switched by arranging a switch such as a transistor between the quenching element 202 and the APD 201 or between the photoelectric conversion unit 102 and the signal processing circuit 103. Likewise, the supply of the drive voltage VH or the drive voltage VL supplied to the photoelectric conversion unit 102 may be electrically switched using a switch such as a transistor.

Figure 5:
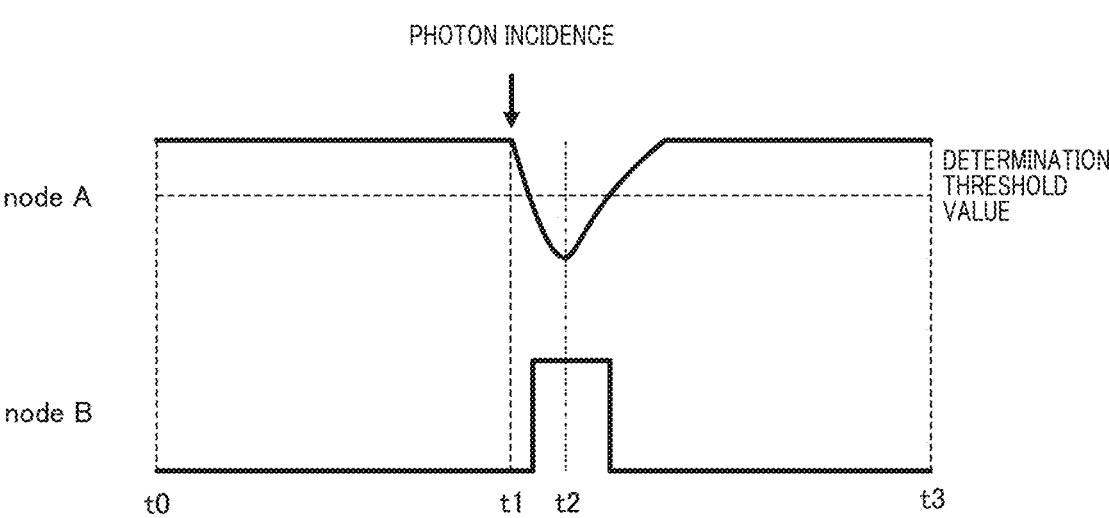
FIG. 5 is a diagram schematically showing a relationship between an operation of an APD 201 and an output signal.

FIG. 5 is a diagram schematically showing a relationship between the operation of the APD 201 and the output signal. The input side of the waveform shaping unit 210 is set as node A and the output side is set as node B. Between time t0 and time t1, a potential difference of VH-VL is applied to the APD 201. When photons are incident on the APD 201 at time t1, avalanche multiplication occurs in the APD 201, an avalanche multiplication current flows through the quenching element 202, and the voltage of node A drops.

When an amount of voltage drop further increases and the potential difference applied to the APD 201 decreases, the avalanche multiplication of the APD 201 stops as at time t2 and the voltage level of node A does not drop to a certain value or less.

Thereafter, an electric current compensating for the voltage drop from the drive voltage VL flows through node A between time t2 and time t3 and node A settles at an original potential level at time t3. At this time, a portion whose output waveform exceeds a certain threshold value at node A is waveform-shaped by the waveform shaping unit 210 and output as a pulse signal at node B.

Figure 6:
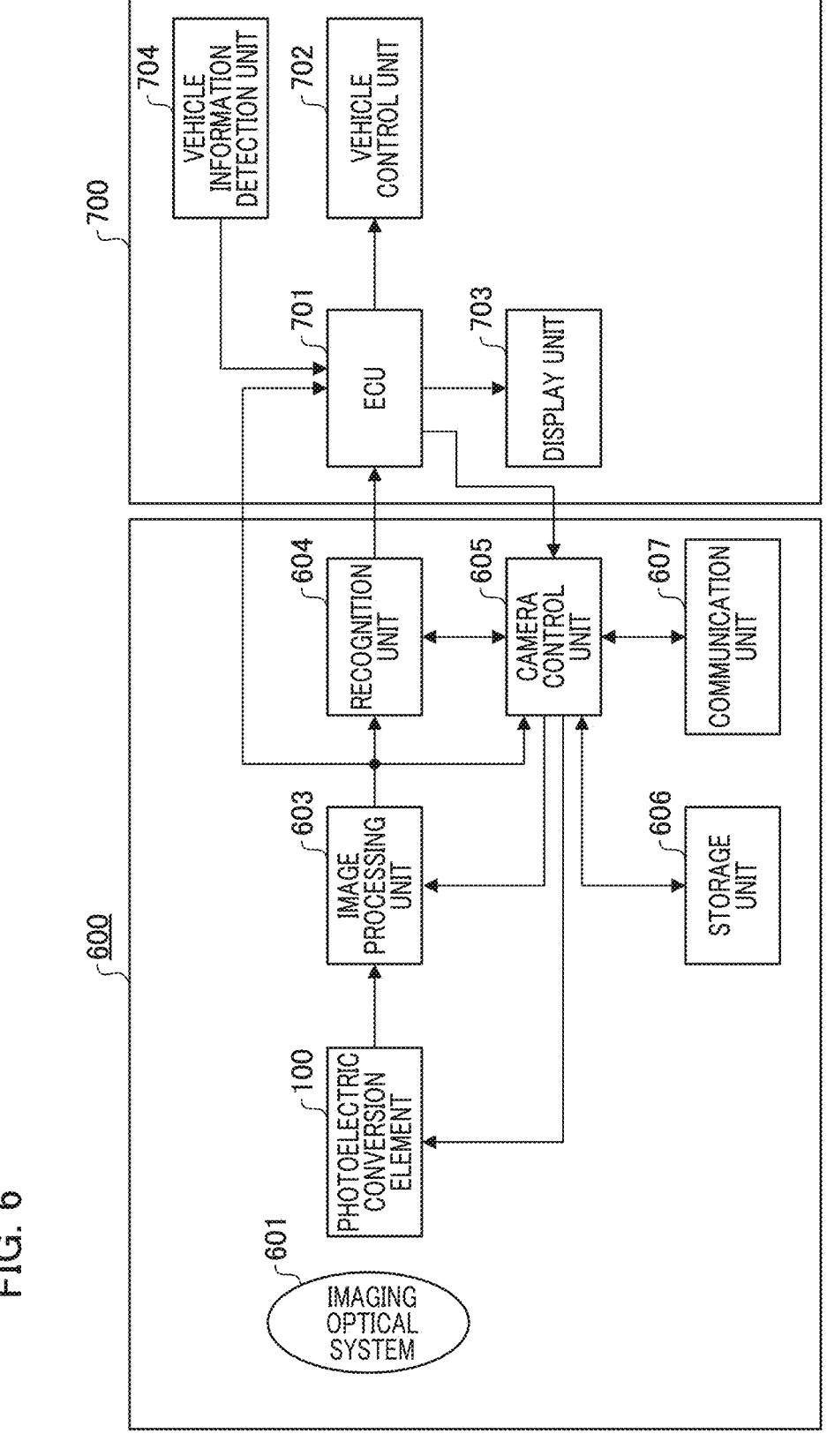
FIG. 6 is a functional block diagram of an imaging system 600 and a movable apparatus 700 according to the embodiment.

FIG. 6 is a functional block diagram of the imaging system 600 and the movable apparatus 700 according to the embodiment. Furthermore, some of the functional blocks shown in FIG. 6 are realized by executing a computer program stored in a memory serving as a storage medium (not shown) on a computer (not shown) included in the imaging system 600 and the movable apparatus 700.

However, some or all of the functional blocks may be realized with hardware. As the hardware, a dedicated circuit (ASIC), a processor (a reconfigurable processor or a DSP), or the like can be used. Also, the functional blocks shown in FIG. 6 may not be built into the same housing, and may be configured as separate devices connected to each other via signal paths.

The imaging system 600 includes the photoelectric conversion element 100, an imaging optical system 601, an image processing unit 603, a recognition unit 604, a camera control unit 605, a storage unit 606, a communication unit 607, and the like. The photoelectric conversion element 100 includes an avalanche photodiode for photoelectrically converting an optical image described with reference to FIGS. 1 to 5.

The imaging system of the embodiment is mounted in the movable apparatus 700 and a camera unit including a set of the imaging optical system 601 and the photoelectric conversion element 100 is configured to perform an imaging process in, for example, at least one of forward, rearward, and side directions of the movable apparatus. Furthermore, a plurality of camera units may be provided in the movable apparatus 700.

The image processing unit 603 performs image processing on the signal output from the pixel. Also, the image processing unit 603 performs predetermined image processing on the image signal on the basis of region information output from the camera control unit 605 and generates a final image signal. The predetermined image processing includes, for example, predetermined image processing such as contour enhancement, black level correction, gamma curve adjustment, noise reduction, digital gain adjustment, demosaic processing, and data compression.

Furthermore, when the photoelectric conversion element 100 has an on-chip color filter of RGB or the like, it is desirable for the image processing unit 603 to perform processing such as white balance correction and color conversion. Furthermore, an output of the image processing unit 603 is supplied to the recognition unit 604, an electronic control unit (ECU) 701 of the movable apparatus 700, and the camera control unit 605.

The recognition unit 604 performs image recognition based on a result of the image processing. That is, a nearby person or vehicle and the like are recognized by performing image recognition on the basis of an image signal on which image processing has been performed by the image processing unit 603 and a warning or the like is issued as necessary.

Although the movable apparatus 700 will be described using, for example, an example of an automobile, in the present embodiment, the movable apparatus may be anything that can be moved, such as an aircraft, a train, a watercraft, a drone, an AGV, or a robot.

The camera control unit 605 has a built-in CPU serving as a computer and a built-in memory storing a computer program and controls each part of the imaging system 600 when the computer program stored in the memory is executed by the CPU.

Furthermore, the camera control unit 605 functions as a control means, and for example, a length of an exposure period of each frame of the photoelectric conversion element 100, a timing of a control signal CLK, and the like are controlled via the control pulse generation unit of the photoelectric conversion element 100. Also, as will be described below in detail, the recognition process of the recognition unit 604 is controlled on the basis of the output from the ECU 701.

The storage unit 606 includes, for example, a recording medium such as a memory card or a hard disk, and can store and read image signals. The communication unit 607 includes a wireless or wired interface, outputs the generated image signal to the outside of the imaging system 600, and receives various signals from the outside.

The ECU 701 has a built-in CPU serving as a computer and a built-in memory storing a computer program and controls each part of the movable apparatus 700 when the computer program stored in the memory is executed by the CPU.

Also, the ECU 701 is connected to a vehicle information detection unit 704, and information of each part of the vehicle is input to the ECU 701. Specific vehicle information includes outputs of various detection sensors (not shown) in the vehicle such as a traveling speed of the vehicle, a steering angle of a steering wheel, an opening degree of the accelerator, and acceleration.

Furthermore, the vehicle information detection unit 704 performs a recognition process based on the generated signal and outputs information such as the traveling speed, steering angle, and acceleration of the movable apparatus as driving state information about the driving state of the movable apparatus.

The output of the ECU 701 is supplied to the vehicle control unit 702, the display unit 703, and the camera control unit 605. The vehicle control unit 702 functions as a movement control means configured to control the driving, stopping, direction, and the like of the vehicle serving as a movable apparatus on the basis of the output of the ECU 701. Furthermore, the vehicle control unit 702 serving as the movement control means controls the operation of the movable apparatus on the basis of a result of the recognition process using a signal generated in at least the first storage period. The first storage period will be described below.

Also, the display unit 703, for example, includes a display element such as a liquid crystal device or an organic EL and is mounted in the movable apparatus 700. The display unit 703 displays an image acquired by the photoelectric conversion element 100, various information about a traveling state of the vehicle, and the like to the driver of the movable apparatus 700 using, for example, a GUI, on the basis of the output of the ECU 701.

Also, the ECU 701 receives the traveling speed, which is vehicle information detected by the vehicle information detection unit 704, and transmits the traveling speed to the camera control unit 605. The camera control unit 605 outputs a control signal for changing a recognition frequency of image recognition within one full-frame period to the recognition unit 604. The change in the recognition frequency will be described below.

Furthermore, the image processing unit 603, the recognition unit 604, and the like in FIG. 6 may not be mounted in the movable apparatus 700 and may be provided in, for example, an external terminal for remotely controlling the movable apparatus 700 or monitoring the traveling of the movable apparatus or the like provided separately from the movable apparatus 700. The imaging system 600 of the present embodiment includes a plurality of devices connected by this communication path.

Figure 7:
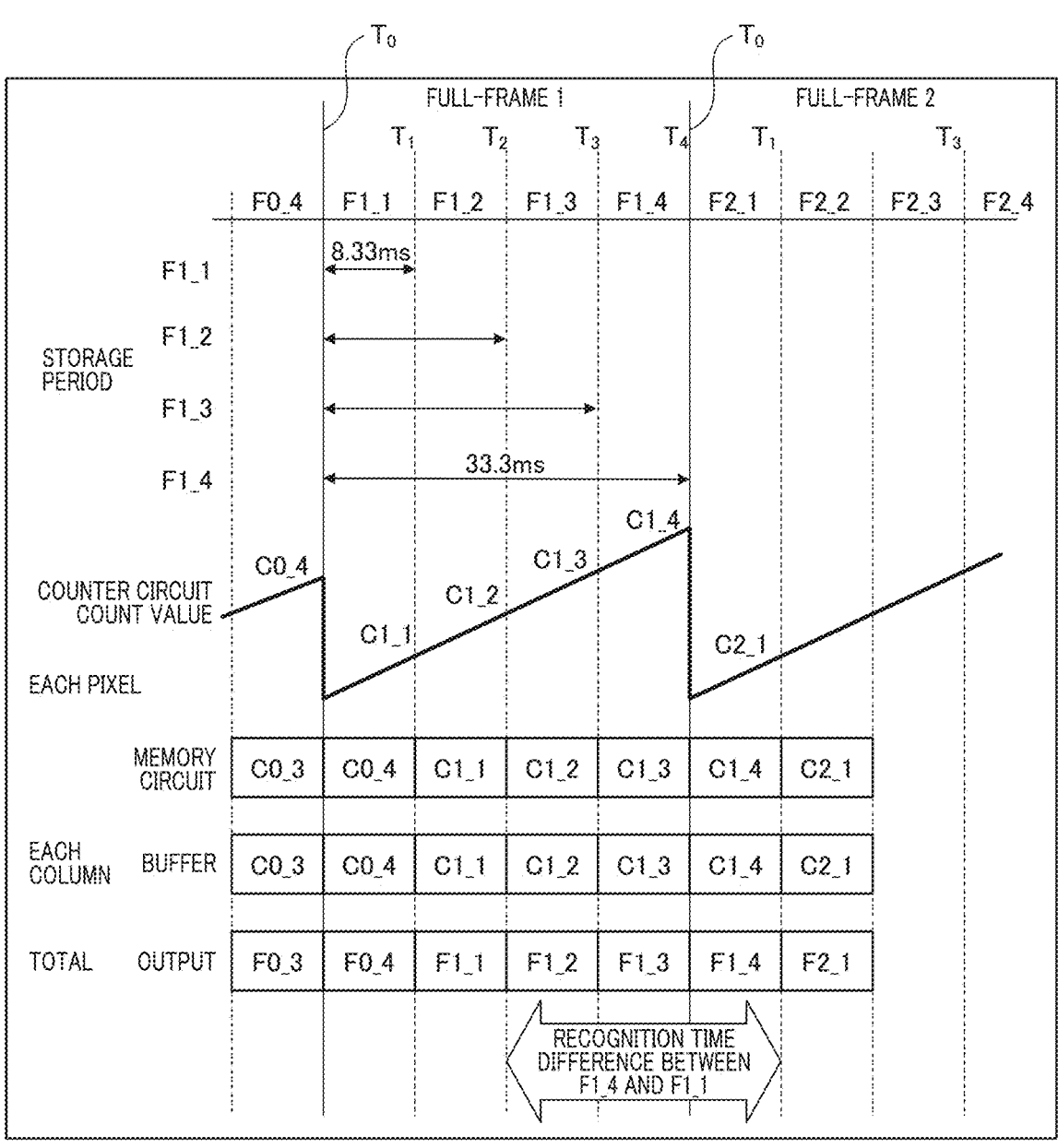
FIG. 7 is an explanatory diagram of an imaging method of a camera control unit 605 according to the embodiment.

FIG. 7 is an explanatory diagram of an imaging method by the camera control unit 605 according to the embodiment. In the present embodiment, for example, a photoelectric conversion process is performed periodically at 30 full-frames/second. Furthermore, in the present embodiment, for example, one frame having a length of 33.3 ms is referred to as a full-frame period (or main frame period) and each of four parts into which a full-frame period is divided is referred to as a frame (or subframe).

That is, as shown in FIG. 7, full-frame 1 is divided into frames 1_1, 1_2, 1_3, and 1_4 at equal intervals (8.33 ms) from time $T_0$ to time $T_4$. Furthermore, in the drawings from FIG. 7, frames 0_3, 0_4, 1_1, 1_2, 1_3, 1_4, 2_1, 2_2, 2_3, and 2_4 are displayed as F0_3, F0_4, F1_1, F1_2, F1_3, F1_4, F2_1, F2_2, F2_3, and F2_4.

Furthermore, frame 1_1 has a storage period from the start time $T_0$ to time $T_1$ of full-frame 1 and frame 1_2 has a storage period from time $T_0$ time $T_2$. Also, frame 1_3 has a storage period from time $T_0$ to time $T_3$ and frame 1_4 has a storage period from time $T_0$ to time $T_4$.

Furthermore, in the present embodiment, for example, the storage period from time $T_0$ to time $T_1$ is referred to as a first storage period and the storage period from time $T_0$ to time $T_4$ is referred to as a second storage period.

Also, the counter circuit 211 is reset at time $T_0$ and count values C1_1, C1_2, C1_3, and C1_4 are acquired from the counter circuit 211 at times $T_1$ to $T_4$.

Also, the count values C1_1, C1_2, C1_3, and C1_4 are temporarily stored in the memory circuit 212. Also, signals for one row temporarily saved in the memory circuit 212 are sequentially output from the photoelectric conversion element via the buffer of the reading circuit 112.

Thus, according to the present embodiment, signals stored during a period of frame 1_1 are read at times $T_1$ to $T_2$ and promptly processed by the recognition unit 604. Therefore, image recognition can be promptly performed. Likewise, signals stored during periods of frame 1_2, frame 1_3, and frame 1_4 are sequentially read across a period of times $T_2$ to $T_3$, a period of times $T_3$ to $T_4$, and a period of times $T_4$ to $T_1$, and image recognition can be iteratively performed.

Figure 8:
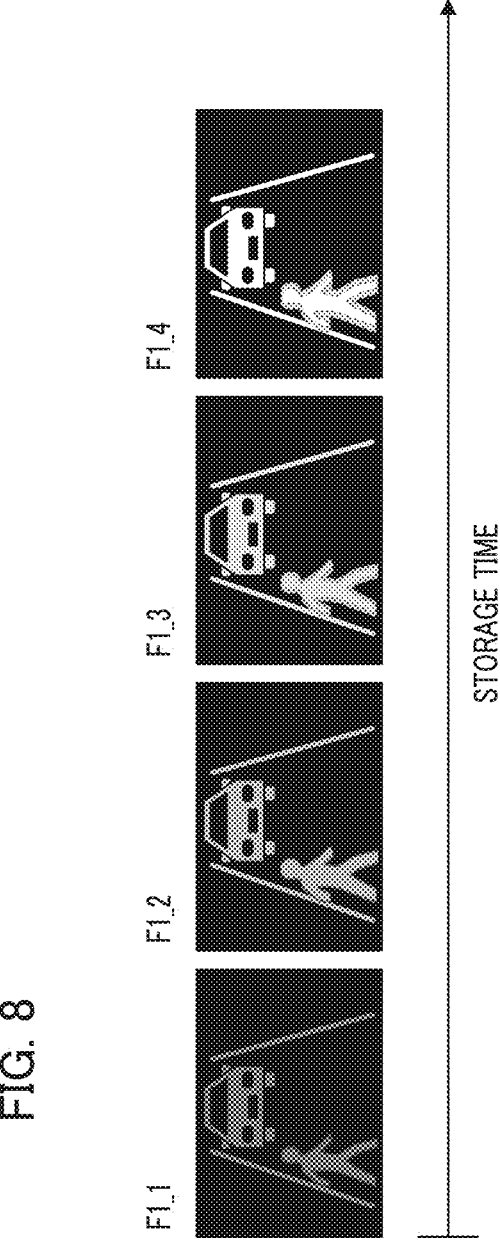
FIG. 8 is a diagram showing an example of images of a plurality of frames into which a full-frame period is divided.

FIG. 8 is a diagram showing an example of images of a plurality of frames into which a full-frame period is divided. As shown in FIG. 8, an image of frame 1_1 is dark because the storage time is short, but there is little blur of the subject of the person who jumped out. On the other hand, because the storage time becomes longer in the order of frame 1_2, frame 1_3, and frame 1_4, subject blur is likely to occur. Furthermore, blur is unlikely to occur in a stopped vehicle and white lines, and contrast is more likely to be improved when the storage time is longer.

Thus, in the control step of the camera control unit 605 of the present embodiment, storage operations of a first storage period and a second storage period are performed within one full-frame period. Also, the first storage period is shorter than the second storage period and signals generated in the first storage period are controlled to be output between the end of the first storage period and the end of the second storage period.

Also, in the present embodiment, the first storage period and the second storage period overlap and the first storage period and the second storage period start at the same time. Furthermore, the frame is broken at the end of the second storage period, and the second storage period is an integer multiple of the first storage period. That is, the time when the second storage period ends coincides with the time when the full-frame period ends.

However, the second storage period does not have to be an integer multiple of the first storage period. It is only necessary to set the second storage period longer than the first storage period (the first storage period shorter than the second storage period) and it is only necessary to set the end of the second storage period later than the end of the first storage period.

That is, an image with a short storage period and an image with a long storage period are created, the timing at which the short storage period ends is made earlier than the timing at which the long storage period ends, and the image is output and sent to the subsequent recognition unit as soon as the short storage time ends. Also, the subject is recognized on the basis of at least the signal generated in the first storage period. That is, the recognition unit 604 serving as a recognition means recognizes a subject on the basis of at least a signal generated in the first storage period.

Therefore, image recognition cannot be performed before the elapse of one full-frame period in the conventional technology, but in the present embodiment, image recognition can be performed after a quarter of a full-frame period at the earliest, for example, obstacles and the like can be promptly recognized when a movable apparatus is moving at a high speed. Therefore, it is possible to promptly apply a braking process. Alternatively, it is possible to avoid obstacles at an early stage.

Furthermore, because an image with a long storage time can improve the contrast, it can be used as a display image. That is, an image with a short storage time is suitable for quick subject recognition and an image with a long storage time is suitable for a display image.

Thus, the display unit 703 of the present embodiment displays at least a signal generated in the second storage period as an image. Furthermore, the recognition unit 604 may further recognize the subject on the basis of the signal generated in the second storage period.

Also, because the APD is used in the present embodiment, it is possible to cause storage periods to overlap because the stored electric charge does not deteriorate due to a reading process unlike the CMOS sensor. Also, because there is no noise in the reading process, an original signal does not deteriorate no matter how many times it is read after one storage process.

Figure 9:
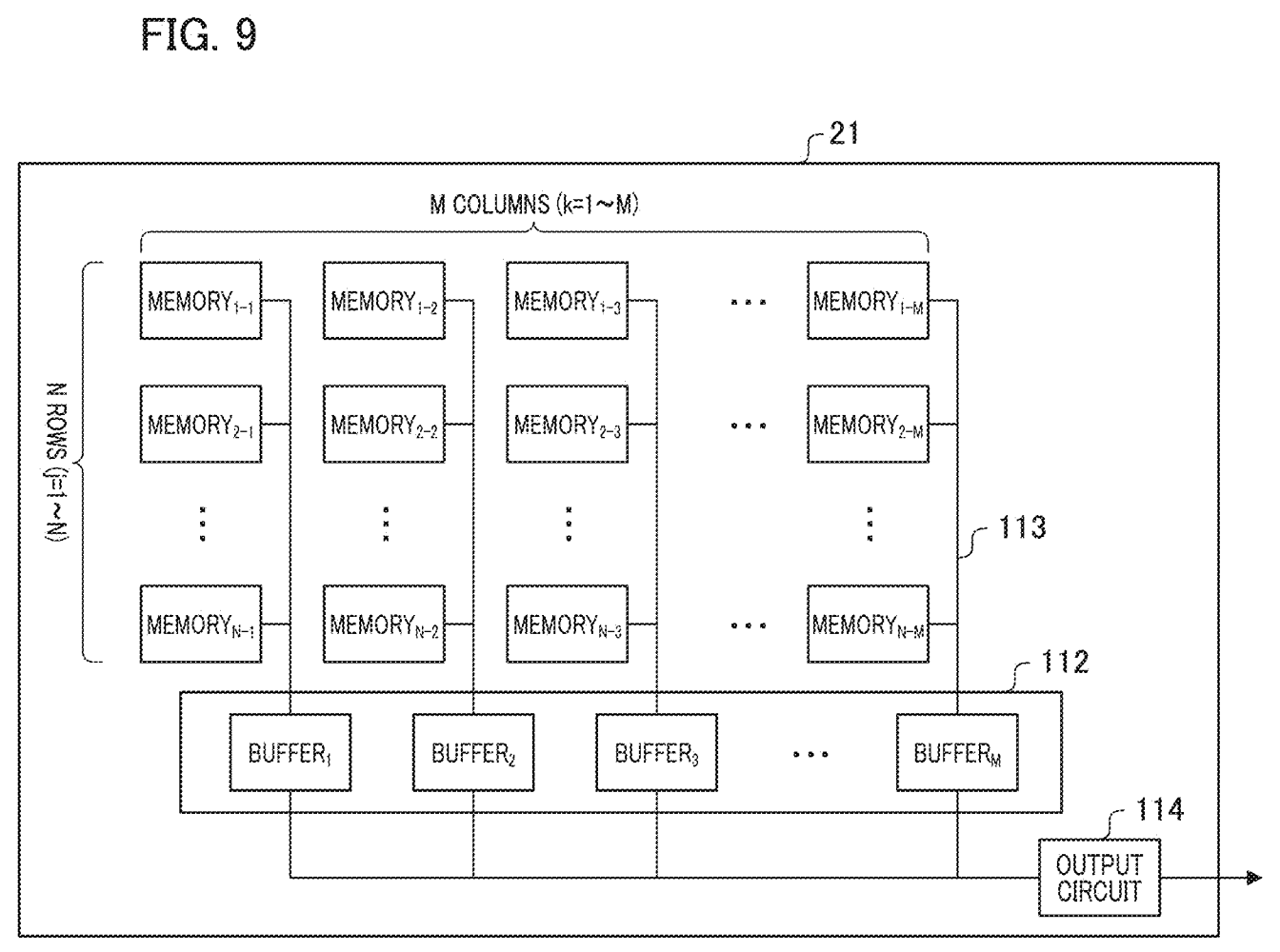

FIG. 9 is a diagram showing a relationship of memory circuits and buffers in the embodiment. In FIG. 9, memory circuits 212 in the signal processing circuit 103 of FIG. 3 are arranged in N rows and M columns and the memory circuits are represented as memories 1-1 to N-M. Also, buffers 1 to M in FIG. 9 are buffers included in the reading circuit 112 in FIG. 3. An output circuit 114 in FIG. 9 corresponds to the output circuit 114 in FIG. 3.

Figure 10:
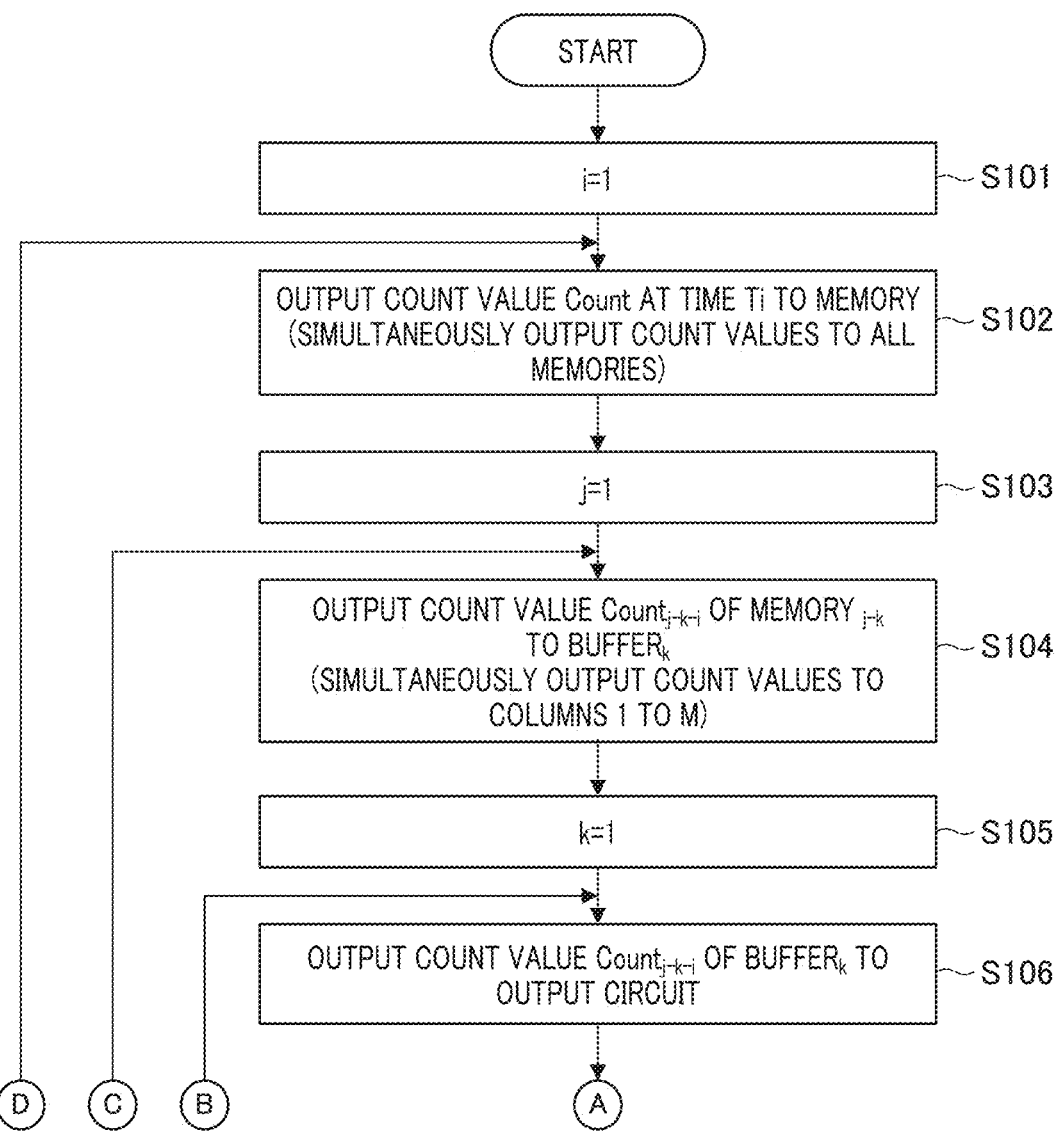
FIG. 10 is a flowchart showing details of an example of driving of the photoelectric conversion element in the embodiment.
Figure 11:
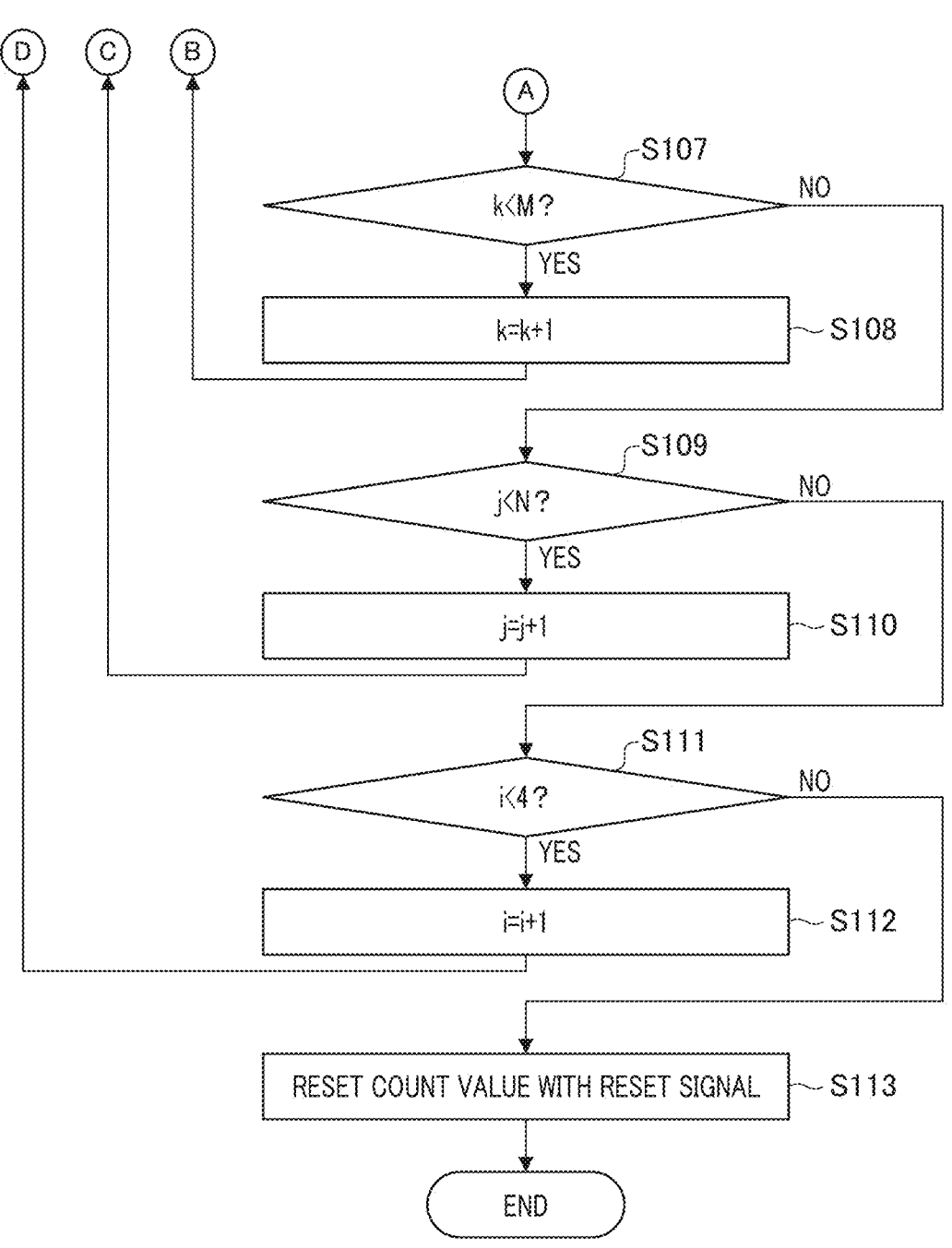
FIG. 11 is a flowchart subsequent to FIG. 10.

FIG. 10 is a flowchart showing details of an example of driving of a photoelectric conversion element in an embodiment and FIG. 11 is a flowchart subsequent to FIG. 10. Furthermore, the operations of steps of the flowchart of FIGS. 10 and 11 are sequentially performed when a computer program stored in the memory is executed by the CPU or the like serving as a computer within the camera control unit 605.

In step S101 of FIG. 10, i=1 is set. Subsequently, in step S102, a count value Count of the counter circuit 211 at time $T_i$ is output to the memory circuit 212. At this time, output processes are simultaneously performed with respect to all memory circuits. This operation corresponds to the operation at time $T_1$ in FIG. 7.

Subsequently, j=1 is set in step S103, and a count value $Count_{j-k-i}$ in the memory circuit j-k of FIG. 9 is output to the buffer in step S104. At this time, the count value is simultaneously output to the buffers in columns 1 to M. This operation means that a count value of a first row of FIG. 9 is input to the buffer.

Subsequently, k=1 is set in step S105 and the count value $Count_{j-k-i}$ of buffer k is output to the output circuit 114 in step S106. This operation corresponds to an operation of reading a signal of a buffer in a leftmost column of FIG. 9 from the output circuit.

Subsequently, the process proceeds to step S107 of FIG. 11 via A, and it is determined whether k<M in step S107. When a determination result is Yes, k is incremented by 1 as k=k+1 in step S108, the process returns to step S106 via B, and an operation of step S106 is performed. This operation corresponds to an operation of reading a signal of a buffer in a second column from the left in FIG. 9 from the output circuit.

When the determination result is No in step S107, i.e., when k=M, it means that a signal of a buffer in column M of FIG. 9 has been read from the output circuit. Subsequently, the process proceeds to step S109 to determine whether j<N. When a determination result is Yes in step S109, j=j+1 in step S110, j is incremented by 1, and the process returns to step S104 via C. This corresponds to an operation of starting the reading of the next row.

When a determination result is No in step S109, it means that the reading of all rows has ended. The process proceeds to step S111 to determine whether or not j<4. When a determination result is Yes in step S111, the process proceeds to step S112, i=i+1, i is incremented by 1, and the process returns to step S102 via D. This operation corresponds to an operation of starting the reading at the next time $T_2$.

When a determination result is No in step S111, because it means that the reading at time $T_4$ is completed, the process proceeds to step S113 and the counter circuit 211 is reset with a reset signal. This operation is a reset operation of the counter circuit 211 of time $T_4$ in FIG. 7. As described above, the signals stored in the photoelectric conversion element 100 can be sequentially read.

Next, an example in which a frequency of an image recognition process executed by the recognition unit 604 is changed on the basis of an output of the vehicle information detection unit 704 will be described with reference to FIGS. 12 to 14.

Figure 12:
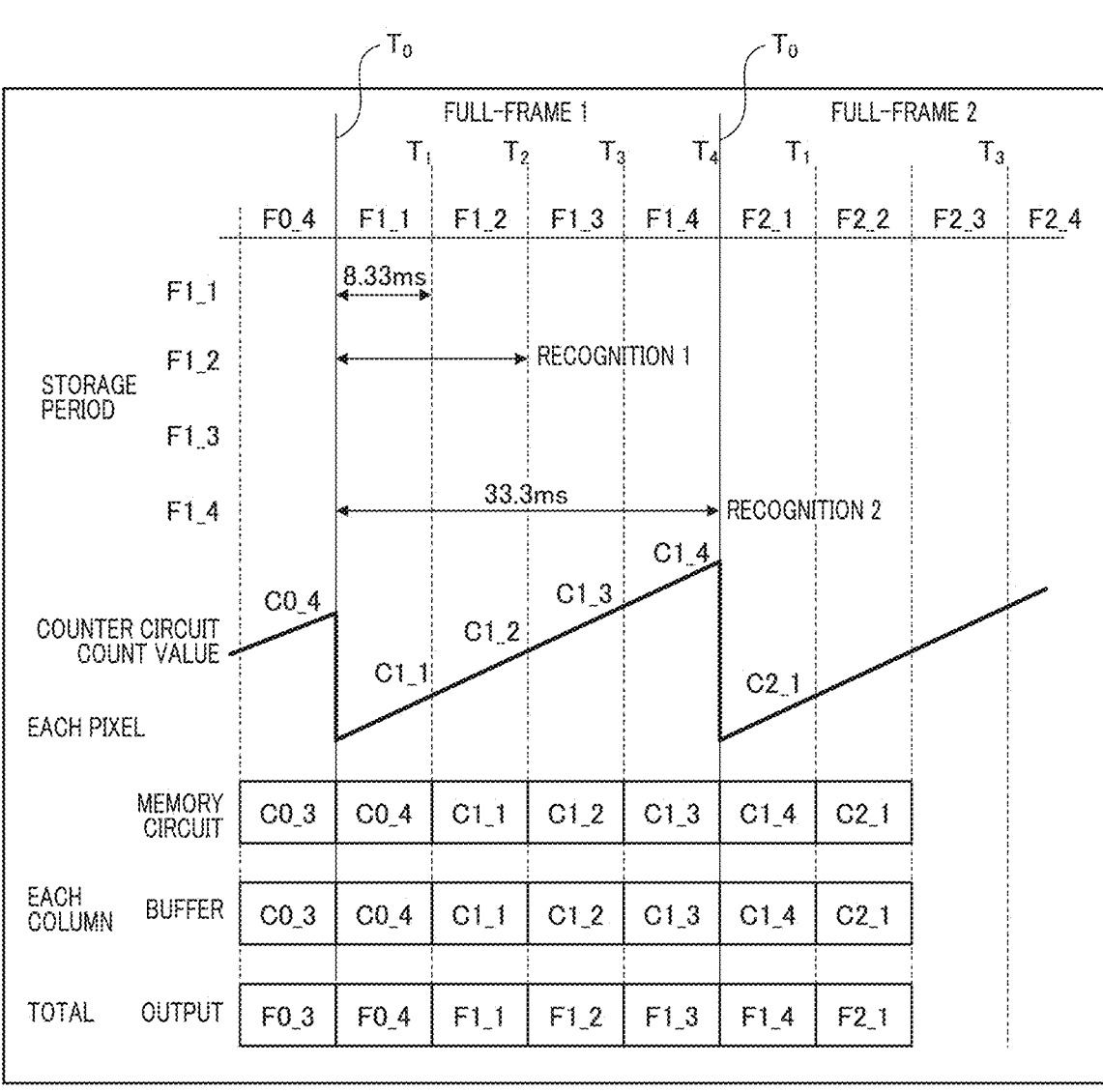
FIG. 12 is an explanatory diagram of a recognition frequency when a traveling speed of vehicle information is low in the embodiment.

FIG. 12 is an explanatory diagram of a recognition frequency when the traveling speed of the vehicle information is low in the embodiment. As in the example shown in FIG. 7, full-frame 1 is divided into frames 1_1, 1_2, 1_3, and 1_4 at equal intervals (8.33 ms).

However, when the traveling speed detected by the vehicle information detection unit 704 becomes a low speed, for example, when the traveling speed becomes 40 km/h (predetermined threshold speed) or less, a notification is provided from the ECU 701 to the camera control unit 605. Thereby, the frequency of image recognition executed by the recognition unit 604 is reduced. That is, the signals of the storage periods of frames 1_2 and 1_4 are read and the number of times image recognition is performed is reduced to 2.

Next, a case where image recognition is performed twice will be described. FIG. 13 is a diagram schematically showing a relationship between a traveling speed of an automobile and a human visual field angle. It is known that the human visual field angle changes with the traveling speed, and, for example, the visual field angle is about 100° at 40 km/h as shown in FIG. 13.

Therefore, because it is possible to relatively promptly detect people and obstacles jumping out in front of the vehicle, the frequency of recognition is reduced and the processing load is reduced so that the support by image recognition is limited and warnings based on a recognition process and the like are not frequently performed in the present embodiment.

Also, even if the recognition frequency of image recognition is reduced, image recognition cannot be performed before the elapse of one full-frame period in the conventional technology, whereas image recognition can be performed every half of a full-frame period in the present embodiment. Therefore, when the movable apparatus is moving, an obstacle or the like can be promptly recognized and braking can be promptly applied.

Alternatively, because it is possible to avoid obstacles at an early stage and image recognition when the traveling speed is low can be performed twice within one full-frame period, this improves the accuracy of image recognition as compared with when image recognition is performed only once within one full-frame period.

Furthermore, the traveling speed (predetermined threshold speed) of the vehicle information for reducing the frequency of image recognition is set to 40 km/h or less, but the traveling speed is not limited thereto and can be set to any speed.

Figure 14:
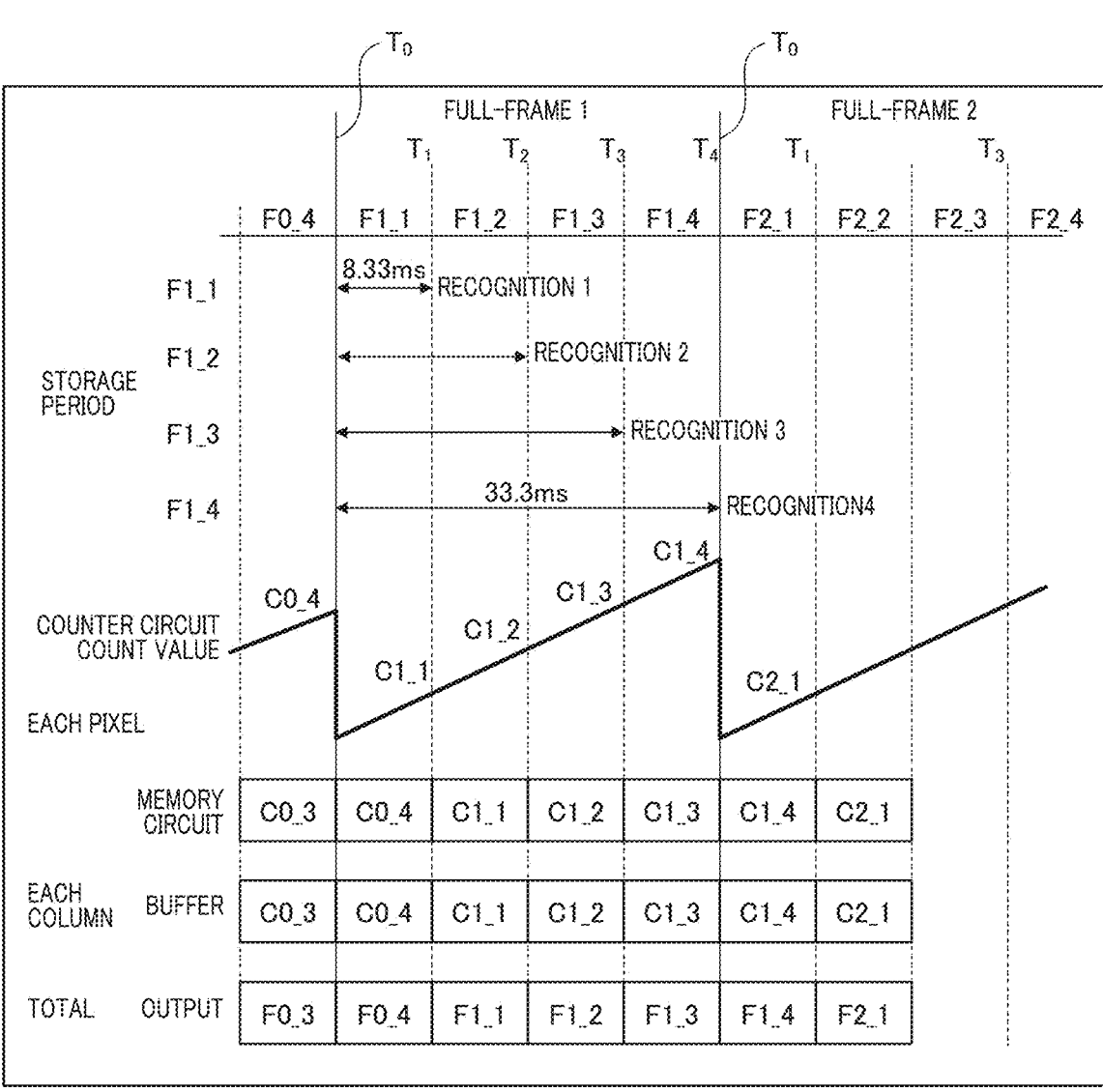
FIG. 14 is an explanatory diagram of the recognition frequency when the traveling speed of the vehicle information is high in the embodiment.

FIG. 14 is an explanatory diagram of the recognition frequency when the traveling speed of the vehicle information is high in the embodiment. As in the example shown in FIG. 7, full-frame 1 is divided into frames 1_1, 1_2, 1_3, and 1_4 at equal intervals (8.33 ms).

When the traveling speed detected by the vehicle information detection unit 704 exceeds a high speed, for example, 40 km/h, a notification is provided, for example, from the ECU 701 to the camera control unit 605. Thereby, the frequency of image recognition executed by the recognition unit 604 is increased and the signals of the storage periods of frame 1_1, frame 1_2, frame 1_3, and frame 1_4 are read to increase the number of times image recognition is performed to 4 so that the recognition unit performs the recognition process of the subject a plural time within the second storage period.

That is, at this time, the number of times the recognition unit recognizes the subject is 4, which is a sum of the maximum number of recognition processes based on the signals generated in the plurality of first storage periods, which are storage periods of frame 1_1, frame 1_2, frame 1_3, within the second storage period and one time of the recognition process based on the signal generated in the second storage period (frame 1_4).

This is because the driver gazes ahead and the visual field angle is narrowed as a traveling speed of a host vehicle increases. As shown in FIG. 13, for example, at 100 km/h, the human visual field angle is about 40°.

In this way, when the host vehicle travels at a high speed, if the human visual field angle is narrowed, it is necessary to perform a support process according to a recognition process based on image recognition at an early stage because vehicles changing lanes from adjacent lanes may be overlooked.

Image recognition cannot be performed before the elapse of one full-frame period in the conventional technology. However, in the present embodiment, image recognition can be performed after a quarter of a full-frame period at the earliest and it is possible to reduce the decrease in the recognition rate due to linear subject blur that occurs in a traveling direction when a movable apparatus moves at a high speed.

Furthermore, at this time, as shown in FIG. 14, intervals at which the recognition unit starts the recognition process are equal. In this way, when the traveling speed is relatively high, it is possible to promptly recognize an obstacle or the like by performing a control process of relatively increasing a recognition frequency, it is possible to promptly apply braking, and the like. Alternatively, it is possible to avoid obstacles at an early stage.

Furthermore, the ECU 701 may notify the camera control unit 605 of the traveling speed, and the camera control unit 605 may determine whether or not the traveling speed is less than or equal to a predetermined threshold speed.

Figure 15:
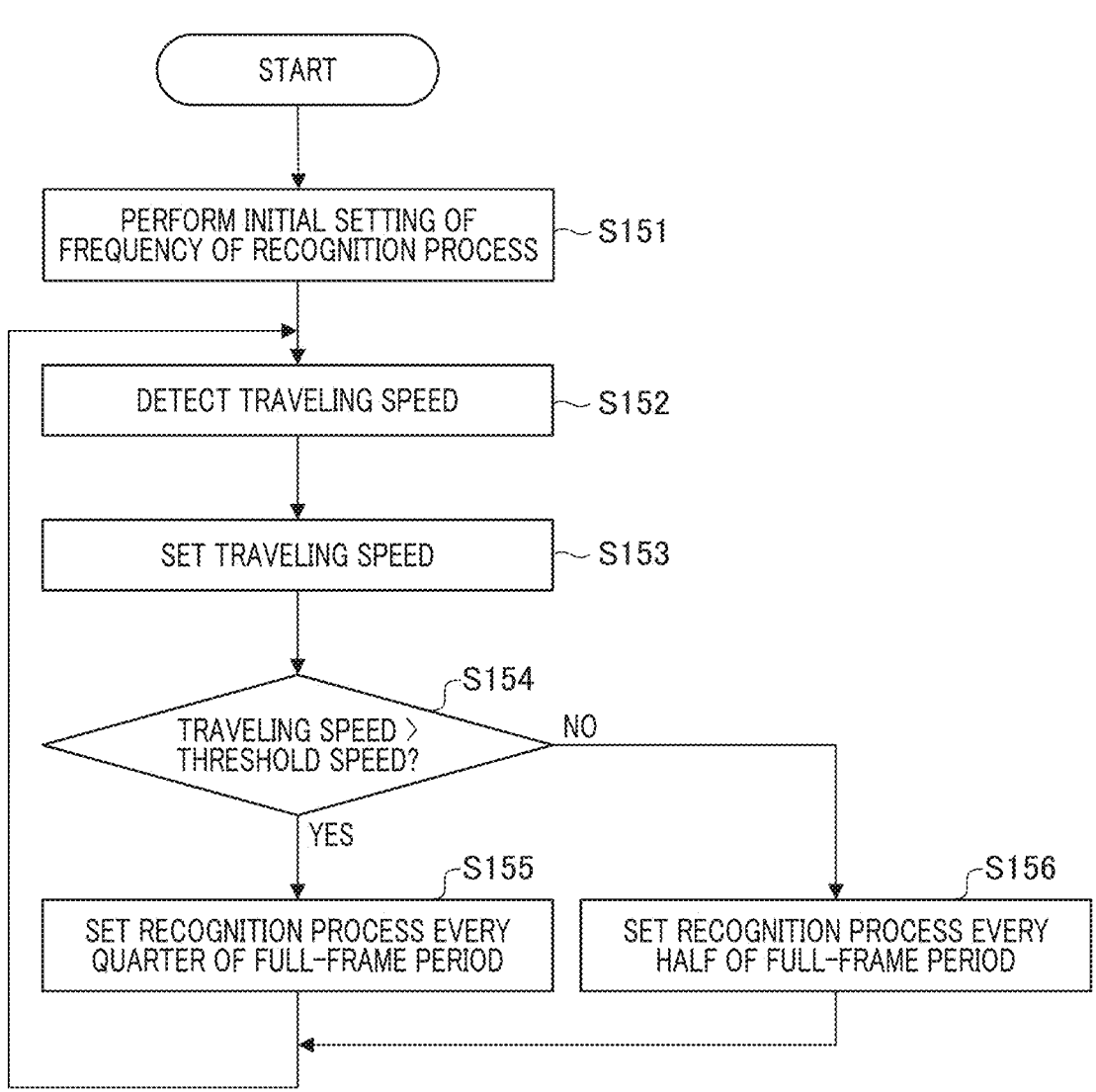
FIG. 15 is an explanatory flowchart of a control method of changing a frequency of image recognition on the basis of the traveling speed in the embodiment.

FIG. 15 is an explanatory flowchart of a control method of changing the frequency of image recognition on the basis of the traveling speed in the embodiment. When the CPU serving as the computer within the ECU 701 or the camera control unit 605 executes a computer program stored in the memory, the operations of steps of the flowchart of FIG. 15 are sequentially performed.

In step S151 of FIG. 15, the CPU of the camera control unit 605 performs an initial setting of the frequency of the recognition process. At first, because the traveling speed is low, it is only necessary to set the frequency of the recognition process every half of a full-frame period. When initialization of the recognition process is completed, the process proceeds to step S152.

Subsequently, in step S152, the CPU of the ECU 701 detects the traveling speed, which is vehicle information, with a vehicle speed sensor (not shown) within the vehicle information detection unit 704 and acquires the traveling speed in the ECU 701. Subsequently, the CPU of the ECU 701 sets the traveling speed on the basis of the output of the vehicle speed sensor in step S153, and the process proceeds to step S154.

Subsequently, in step S154, the CPU of the ECU 701 or the camera control unit 605 determines whether or not the set traveling speed exceeds a predetermined threshold speed. In the example of FIG. 15, the threshold speed is, for example, 40 km/h at which the visual field angle is 100° with respect to the human traveling speed, and is used as a determination criterion for changing the recognition frequency of image recognition based on the captured image.

If the traveling speed exceeds the threshold speed (in the case of Yes), the process proceeds to step S155. If the traveling speed does not exceed the threshold speed (in the case of No), the process proceeds to step S156.

When the process proceeds to step S155, because the traveling speed exceeds the threshold speed, the CPU of the camera control unit 605 sets the image recognition in the recognition unit 604 to be performed four times within one full-frame period. That is, the recognition process is set so that the recognition process is performed every quarter of a full-frame period. Subsequently, the process returns to step S152.

Figure 13:
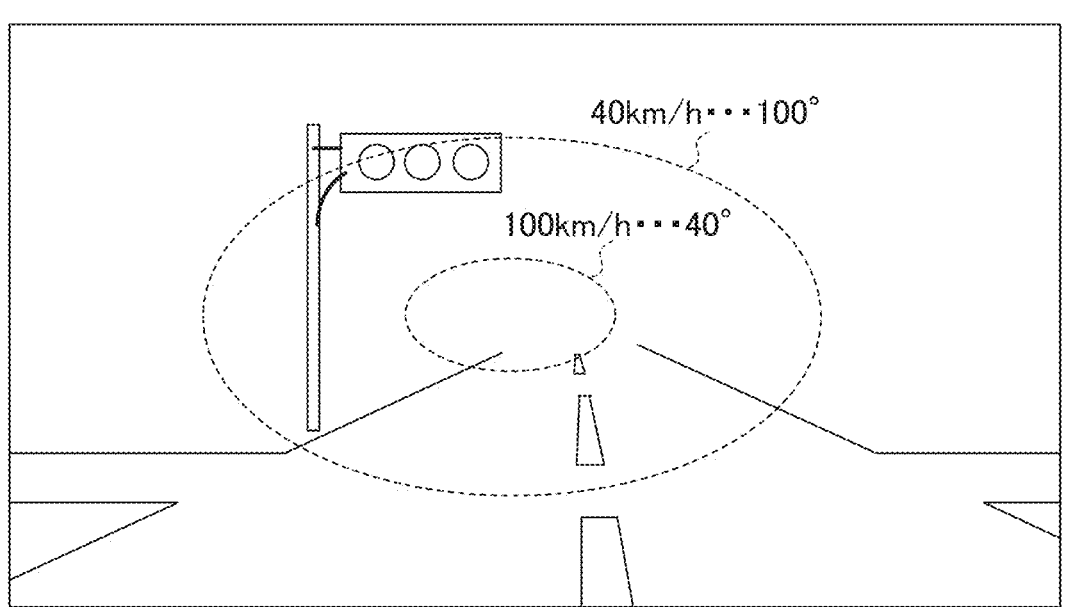
FIG. 13 is a diagram schematically showing a relationship between a traveling speed of an automobile and a human visual field angle.

This is because the frequency of the recognition process within one full-frame period is increased to support against the overlooking of people, automobiles, obstacles, and the like as shown in FIG. 13.

In step S156, because the traveling speed does not exceed the threshold speed, the CPU performs a setting process to perform image recognition twice within one full-frame period. That is, the recognition process in the recognition unit 604 is set every half of a full-frame period. Subsequently, the process returns to step S152. Furthermore, the flow of FIG. 15 is iteratively performed while the power supply of the movable apparatus is turned on.

Furthermore, the reason why the recognition process is set every half of a full-frame period in step S156 is that there is a visual field angle of about 100° at a traveling speed of 40 km/h or less as shown in FIG. 13 and therefore the driver can relatively promptly detect people and obstacles jumping out in front of the vehicle. Also, because the support based on image recognition is limited and warnings based on the recognition process are not frequently performed, the processing load can be reduced.

Furthermore, steps S154 to S156 function as recognition steps of performing the recognition process on the basis of the signal that has been generated and changing the recognition frequency on the basis of driving state information about a driving state of the movable apparatus.

The case where the recognition accuracy is improved by changing the recognition frequency of image recognition when a predetermined switching condition is satisfied on the basis of the traveling speed of the vehicle information has been described in the present embodiment. Furthermore, because the timing of the physical object jumping into a screen is not known in advance, it is preferable to set timings when the recognition process starts at equal intervals for the purpose of minimizing a period of time until recognition is possible without depending on the timing of the physical object jumping into the screen.

Although one threshold speed for the traveling speed has been described in the present embodiment, a plurality of threshold speeds may be set and the recognition frequency of image recognition may be changed for each set threshold speed. Also, the threshold speed may be continuously changed with the speed or the like.

Another example of vehicle information in which the recognition frequency of image recognition during driving of an automobile can be changed to improve the recognition accuracy is the steering angle of the steering wheel. For example, when the automobile turns at an intersection or even if the automobile travels on a curve, subject blur in a yaw direction (especially on an outer circumferential side) occurs and the recognition rate of image recognition decreases.

Therefore, improvement in recognition accuracy can be expected by changing the recognition frequency of image recognition when a predetermined switching condition is satisfied on the basis of the steering angle of the steering wheel. Also, the recognition frequency may be changed with a combination of the steering angle of the steering wheel and the traveling speed at the time of turning.

Also, for example, the threshold speed or recognition frequency may be appropriately changed with the response characteristics of the driver, the age of the driver, the surrounding environment, and the like.

Furthermore, the response characteristics of the driver can be measured, for example, by sequentially displaying a plurality of test patterns on the display, for example, when a movable apparatus starts, and measuring a manipulation speed on the driver's display in response thereto. Alternatively, the front may be imaged during traveling and the delay time of the brake manipulation in response to the change in the subject may be sequentially measured and averaged, or measured by deep learning.

Also, the age of a driver may be registered for each driver using a menu screen of a display within the movable apparatus through a registration manipulation and the age may be registered in association with the driver's face image by imaging the driver's face with the in-vehicle camera.

Also, the driver's face may be imaged with the in-vehicle camera to recognize the driver during traveling, and the recognized driver's age may be acquired from registered data. Alternatively, the driver's face may be imaged with the in-vehicle camera and the driver's age may be estimated in deep learning using, for example, an external server. Furthermore, it is only necessary to measure the surrounding environment using a sensor or from an image of a camera that images the outside of the vehicle.

Also, when the driver's response characteristics are lower, the age is older, or the surrounding environment is worse (the brightness is darker, an amount of rainfall or snowfall is larger, an amount of surrounding traffic (the number of movable apparatuss) is larger, or the like), the above-described predetermined threshold speed may be further lowered or the recognition frequency may be relatively increased.

That is, it is only necessary for the recognition unit 604 to change the recognition frequency according to the driving state information about the driving state of the movable apparatus, and the driving state information includes at least one of the traveling speed of the movable apparatus, the steering angle of the movable apparatus, the response characteristics of the driver of the movable apparatus, the age of the driver of the movable apparatus, and the surrounding environment of the movable apparatus.

Although the present invention has been described above in detail on the basis of preferred embodiments, the present invention is not limited to the above-described embodiments and various modifications can be made on the basis of the spirit of the present invention and they are not excluded from the scope of the present invention.

For example, in the above-described embodiment, the storage of a quarter of a full-frame period at the earliest is performed. However, even when the reading cycle is a quarter of a full-frame period, the counter circuit may be reset within the storage period of frame 1_1 in FIG. 7 in accordance with the brightness of the subject, the image recognition accuracy, or the like. Thereby, the substantial storage period may be shorter than a quarter of a full-frame period.

Alternatively, at time $T_1$ or the like in FIG. 7, the counter circuit may be temporarily reset. Thereby, the count value read at time $T_4$ may be adjusted.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the imaging system or the like through a network or various storage media. Then, a computer (or a CPU, an MPU, or the like) of the imaging system or the like may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

This application claims the benefit of priority from Japanese Patent Application No. 2023-103782, filed on Jun. 23, 2023, which is hereby incorporated by reference herein in its entirety.

What is claimed is:

1. An imaging system comprising:
a plurality of pixels each including a sensor unit configured to output pulses corresponding to photons and a counter configured to count the number of pulses; and
at least one processor or circuit configured to function as:
a control unit configured to generate a signal on the basis of a difference between count values of the counter when a storage period starts and when the storage period ends, perform storage operations of a first storage period and a second storage period within one full-frame period, and perform a control process in which the first storage period is shorter than the second storage period and a signal generated in the first storage period is output between an end of the first storage period and an end of the second storage period; and
a recognition unit configured to perform a recognition process on the basis of the generated signal and change a recognition frequency on the basis of driving state information about a driving state of a movable apparatus.

2. The imaging system according to claim 1, wherein intervals between timings at which the recognition unit starts the recognition process are equal.

3. The imaging system according to claim 1, wherein the first storage period overlaps the second storage period.

4. The imaging system according to claim 3, wherein the first storage period and the second storage period simultaneously start.

5. The imaging system according to claim 1, wherein the time when the second storage period ends coincides with the time when the full-frame period ends.

6. The imaging system according to claim 1, wherein the recognition unit recognizes a subject on the basis of at least the signal generated in the first storage period.

7. The imaging system according to claim 6, wherein the recognition unit further recognizes the subject on the basis of a signal generated in the second storage period.

8. The imaging system according to claim 6, wherein the recognition unit performs the recognition process of the subject based on the signals generated in the plurality of first storage periods within the second storage period.

9. The imaging system according to claim 1, comprising a display unit configured to display at least the signal generated in the second storage period as an image.

10. The imaging system according to claim 1, wherein the sensor unit includes an avalanche photodiode.

11. The imaging system according to claim 1, wherein the driving state information includes at least one of a traveling speed of the movable apparatus, a steering angle of the movable apparatus, response characteristics of a driver of the movable apparatus, the age of the driver, and a surrounding environment of the movable apparatus.

12. A movable apparatus comprising:

a plurality of pixels each including a sensor unit configured to output pulses corresponding to photons and a counter configured to count the number of pulses; and at least one processor or circuit configured to function as:

a control unit configured to generate a signal on the basis of a difference between count values of the counter when a storage period starts and when the storage period ends, perform storage operations of a first storage period and a second storage period within one full-frame period, and perform a control process in which the first storage period is shorter than the second storage period and a signal generated in the first storage period is output between an end of the first storage period and an end of the second storage period;

a recognition unit configured to perform a recognition process on the basis of the generated signal and change a recognition frequency on the basis of driving state information about a driving state of a movable apparatus; and a movement control unit configured to control an operation of the movable apparatus on the basis of a result of the recognition process using at least the signal generated in the first storage period.

13. An imaging method of an imaging system including a plurality of pixels each including a sensor unit configured to output pulses corresponding to photons and a counter configured to count the number of pulses; and, the imaging method comprising:

generating a signal on the basis of a difference between count values of the counter when a storage period starts and when the storage period ends;

performing storage operations of a first storage period and a second storage period within one full-frame period and performing a control process in which the first storage period is shorter than the second storage period and a signal generated in the first storage period is output between an end of the first storage period and an end of the second storage period; and performing a recognition process on the basis of the generated signal and changing a recognition frequency on the basis of driving state information about a driving state of a movable apparatus.

14. A non-transitory computer-readable storage medium configured to store a computer program to control an imaging system, wherein the imaging system includes:

a plurality of pixels each including a sensor unit configured to output pulses corresponding to photons and a counter configured to count the number of pulses, and wherein the computer program comprises instructions for executing following processes of:

generating a signal on the basis of a difference between count values of the counter when a storage period starts and when the storage period ends;

performing storage operations of a first storage period and a second storage period within one full-frame period and performing a control process in which the first storage period is shorter than the second storage period and a signal generated in the first storage period is output between an end of the first storage period and an end of the second storage period; and performing a recognition process on the basis of the generated signal and changing a recognition frequency on the basis of driving state information about a driving state of a movable apparatus.

* * * * *